United States Patent Office 3,458,325
Patented July 29, 1969

3,458,325
PROCESS FOR PRODUCING A DEHYDRATED
INSTANT POTATO PRODUCT FROM POTATO
FLAKES AND POTATO GRANULES
Roderick G. Beck, Blackfoot, Idaho, assignor to
American Potato Company
No Drawing. Filed Apr. 14, 1966, Ser. No. 542,461
Int. Cl. A23l 1/12
U.S. Cl. 99—207                                                    1 Claim

ABSTRACT OF THE DISCLOSURE

A process for making a new dehydrated potato product for producing a dish of mashed potato upon reconstitution by dry mixing a major proportion of potato flakes with a minor proportion of potato granules, moistening the dry mix to form a damp intermediate and then drying the same. The resultant product consists of small porous balls of substantially intact potato cells wholly without flake identity, but having a bulk density midway between that of flakes and granules.

---

This invention relates to a process for producing a novel dehydrated instant mashed potato product and more particularly to a process utilizing a mixture of potato flakes and potato granules to produce porous roughly spherical particles which reconstitute fully in unheated water and which absorb appreciably more liquid in hot or cold reconstitution than potato granules.

Two types of dehydrated potato products from which instant mashed potatoes can be made by reconstitution in liquid have met with acceptance by housewives, institutions, and the Armed Forces. Potato granules and potato flakes are both produced commercially in large amounts. The advantages and disadvantages of both are discussed thoroughly in the prior art such as U.S. Patents Nos. 3,067,042; 2,988,543; 3,063,849; and 3,021,223. These can be summarized as follows.

Potato flakes (commercial density about 15 lbs./cu. ft.)

Disadvantages:
 (1) Will not tolerate boiling liquid reconstitution or whipping.
 (2) Density is too low for Armed Forces and most institutional uses.
 (3) Density is too low for economical inert gas packaging.
Advantages:
 (1) Low density is an advantage in housewife applications.
 (2) Can be reconstituted in cold liquid for specialized applications such as frozen TV dinners.

Potato granules (commercial density about 56 lbs./cu. ft.)

Advantages:
 (1) High density is an advantage for Armed Forces and most institutional uses.
 (2) High density allows efficient inert gas packaging which aids storage stability.
 (3) Potato granules can be reconstituted in boiling liquid and can stand whipping without creating poor texture or pastiness.
Disadvantages:
 (1) High density is undesirable for retail sale and use.
 (2) Will not reconstitute in cold liquid.

The prior art cited above deals with processes and products which attempt to retain the natural advantages and reduce or eliminate the disadvantages of commercial potato flakes.

In U.S. No. 3,067, 042 potato flakes are broken to increase the bulk density. The fine fraction which would cause pastiness and starchiness is screened out and added to the mash of the subsequent lot. Precooking and monoglycerides are said to allow this to be done without excessive texture degradation if the percentage of fines is not too high.

In U.S. No. 3,063,849 potato flakes are also ground to pass ⅛ inch. Stickiness which would result from the breaking step is nullified by a final heating step which retrogrades the free soluble starch. The final heated product has a baked potato flavor and is said to be excellent in soups.

In U.S. No. 2,980,543 potato flakes are broken and an "improver" is sprayed on the dry broken flakes to counteract the stickiness created by breaking.

In U.S. No. 3,021,223 potato flakes are broken and then are increased in moisture and manipulated to produce products of increased density. In the moisture is increased to 36–45%, the density of the end product is comparable to potato granules. If the moisture is increased to 25–35%, the density is increased from about 15 lbs./cu. ft. to 35–52 lbs./cu. ft. The end product consists of thick small flakes called flakelets.

Although the processes disclosed in the prior art have resulted in increasing the bulk density of potato flakes, we have found that desirable characteristics have been lost. When dry potato flakes are reduced in size until the density is comparable to that of potato granules, the large quantities of free starch formed causes pastiness in the reconstituted mash even with the use of improvers. When ruptured cells are returned to a fresh mash, even precooking and the use of monoglyceride allow only a small percentage of free starch to be tolerated without pastiness. When excessive heat is used on broken flakes to accomplish retrogradation of soluble free starch, flavor is changed. Furthermore, starch retrogradation reduces water uptake and destroys the ability to reconstitute in cold liquid. Any processing step conducted at high moisture and room temperature incorporated with any appreciable holding time will result in retrogradation and the inevitable loss of desirable rehydration characteristics.

The object of the present invention is to produce a new dehydrated potato product capable of reconstitution in hot or cold liquid and with a density between that of potato flakes and potato granules. The product consists of small porous balls and has a new appearance which is completely different from either potato flakes or potato granules.

Since one of the major differences between the flake and granule processes is the absence of a retrogradation step in the flake process and the necessity of retrogradation in the granule process to attain proper granulation, a study of the effect of (a) moisture content, (b) time, and (c) temperature of retrogradation on cold water absorption was made.

When 100% of −8 mesh potato flakes as well as various mixtures of −8 mesh potato flakes and potato granules were moistened to 42% moisture, mixed, conditioned by standing one hour at room temperature, mixed, and dried, substantial differences were obvious. The dry end product made from −8 mesh flakes alone was very coarse in granulation—50% failed to pass a 20 mesh screen and only 14% passed an 80 mesh screen. The use of −8 mesh potato flakes to produce a fine end product was found to be completely impractical. Although the small percentage of fine material was comparable to potato granules, the coarse half of the end product had such poor reconstitution characteristics that it would be commercially unacceptable. The suggested processing step in the prior art of forcing the coarse fraction through a 0.023 inch opening after sieving the moist mix over a 20 mesh screen is not only extremely damaging to the sensitive potato cells but is commercially completely impractical. In contrast, when one part by weight potato granules was mixed with three parts by weight of −8 mesh potato flakes and handled in exactly the same manner, a very fine damp powder which could be directly dried without further treatment was obtained. The incorporation of a minor percentage of potato granules had surprisingly resulted in a vastly improved product and process.

A second series of tests was run using various moisture levels between 25 and 45% for re-wetting the mixture of 75% −8 mesh potato flakes and 25% potato granules prior to final dehydration. All mixes were allowed to condition by standing at room temperature for one hour, followed by a second mixing step just prior to final drying with the following results:

GRANULATION

| Test No. | Rewet moisture | +20 | −20 +80 | −80 | Cold water rehydration (5:1) |
|---|---|---|---|---|---|
| 10 | 25 | 25 | 59 | 16 | Excellent. |
| 11 | 30 | 30 | 61 | 9 | Good. |
| 12 | 35 | 20 | 67 | 13 | Fair. |
| 13 | 40 | 36 | 56 | 8 | Poor. |
| 6 | 45 | 25 | 64 | 21 | Very poor. |

The results obtained were completely unexpected. The literature indicates that the retrogradation of soluble potato amylose proceeds most rapidly at about 29% moisture; however, in these tests, we found the higher moistures apparently promoted the conversion to insoluble amylose and destroyed the ability of the resulting dry product to rehydrate satisfactorily in cold water. The lower moisture contents of 25 and 30% gave comparable granulation and in the case of the former, retained the ability of the original flake component to rehydrate in cold water. At 30% moisture, the ability to rehydrate in cold water was mostly retained. Apparently, no appreciable retrogradation took place at these lower moisture levels.

A further surprising result was that the end product of Test No. 10 had a unique appearance. It consisted of small porous balls, resembling popcorn balls under low magnification. The incorporation of potato granules apparently resulted in such complete granulation that although only some 25% moisture was in the rewet mix, no flake identity was present. The density of this product was 38.7 lbs./cu. ft.

This new product uniquely has the desirable characteristics of both potato granules and potato flakes, with a density ⅔ that of granules and about twice that of commercial potato flakes. It can be economically gas packed. The product reconstitutes fully in cold water, can be reconstituted in boiling water with proper care, and is capable of absorbing considerably more water than potato granules in both cold and hot water reconstitution. The larger porous particles result in slower reconstitution than in the case of potato granules thereby eliminating a major reconstitution problem often encountered by the housewife. That is to say, if the reconstitution liquid is added to a mass of granules or a mass of granules is added to a pool of liquid at rest, the very fast rehydration of the granules at the limited liquid-granule interface interferes with the penetration of the granule mass, and balls with dry or unreconstituted centers can result.

The following data compare the water absorption of the new porous spheres with conventional potato granules. Water at controlled temperature is added until the reconstituted mass will barely flow when the container is turned on its side. The weight of water absorbed per unit weight of potato constitutes the water absorption (hot or cold).

WATER ABSORPTION

|  | Boiling water | Room temperature water (75° F.) |
|---|---|---|
| Standard potato granules | 5.3 | 3.3 |
| −20 mesh porous spheres (test No. 10) | 7.5 | 6.2 |

The mixing of potato flakes and potato granules gives results which could not be obtained by the use of either product alone. The flake constituent is necessary because the amylose fraction is in the soluble or unretrograded form which is capable of absorbing cold water and larger amounts of hot water. The potato granule fraction is necessary since this is the only way to get the desired small particle size without having ruptured cells which would cause pastiness. Potato granules contain retrograded amylose and do not contribute any stickiness to the mix. This promotes the necessary granulation required to produce products with the improved rehydration characteristics. The flakes and granules used in this process are the standard products of commerce containing the usual additives such as emulsifiers, sulphites, and antioxidants.

I claim:

1. A process for producing a dried instant mashed potato product comprising the steps of mixing dry about 3 parts by weight of potato flakes of about −8 mesh with about 1 part by weight of potato granules, rewetting the dry mix to a moisture of about 25% but below 30%, mixing said rewet mix to yield a coarse granular intermediate, equilibrating said intermediate, and drying.

References Cited

UNITED STATES PATENTS 3,275,458   9/1966   Willard _____ 99—207

OTHER REFERENCES

Eskew et al.: Potato Flakes of Increased Density, September 1966, ARS–73–30, Agric. Res. Ser., USDA, pp. 4–7.

A. LOUIS MONACELL, Primary Examiner

D. M. NAFF, Assistant Examiner